April 3, 1962 C. S. WEBBER 3,028,259
PRESSURE SENSITIVE ADHESIVE TAPES HAVING A PRIMER COATING OF
A HALF ESTER OF A COPOLYMER OF STYRENE AND MALEIC ACID AND A
TERPOLYMER OF BUTADIENE, STYRENE, VINYL PYRIDINE
Filed March 31, 1960

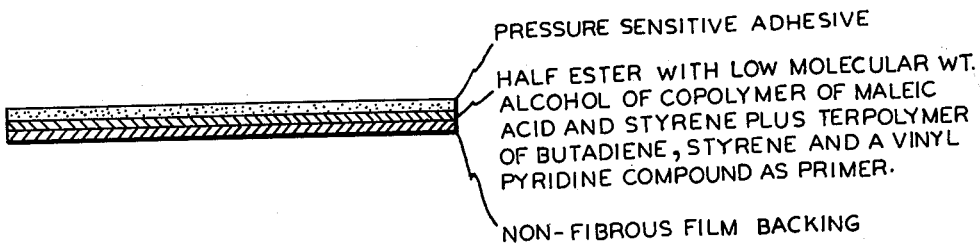

PRESSURE SENSITIVE ADHESIVE

HALF ESTER WITH LOW MOLECULAR WT. ALCOHOL OF COPOLYMER OF MALEIC ACID AND STYRENE PLUS TERPOLYMER OF BUTADIENE, STYRENE AND A VINYL PYRIDINE COMPOUND AS PRIMER.

NON-FIBROUS FILM BACKING

INVENTOR.
CHARLES S. WEBBER
BY
ATTORNEY

United States Patent Office 3,028,259
Patented Apr. 3, 1962

3,028,259
PRESSURE SENSITIVE ADHESIVE TAPES HAVING A PRIMER COATING OF A HALF ESTER OF A COPOLYMER OF STYRENE AND MALEIC ACID AND A TERPOLYMER OF BUTADIENE, STYRENE, VINYL PYRIDINE
Charles S. Webber, Loudonville, N.Y., assignor to Norton Company, Troy, N.Y., a corporation of Massachusetts
Filed Mar. 31, 1960, Ser. No. 18,877
7 Claims. (Cl. 117—76)

This invention relates to non-fibrous film backed pressure sensitive adhesive sheets and tapes and particularly to transparent pressure-sensitive film backed tapes which are highly transparent, practically colorless, and have excellent moisture resistant anchorage of the hydrophobic rubber-resin based adhesive mass to the hydrophilic or hydrophobic non-fibrous film backing.

Smooth non-fibrous films such as regenerated cellulose, cellulose acetate, etc., do not provide any mechanical locking for assisting the bonding of the rubber based pressure sensitive adhesive mass to the backing. Therefore it has been customary in the art to provide a primer or tie coat to increase or assist the bonding of the adhesive mass to the tape. Comon components for these primers have been water soluble mixtures of a hydrophilic substance such as polyvinyl alcohol and a rubber latex. Such primers are susceptible to moisture. When tapes employing such primers are exposed to moist conditions, the non-fibrous film no longer adheres well to the rubber mass resulting in a transfer of adhesive to the article to which the tape may be applied.

Another method of the prior art employs diisocyanates in an organic solvent solution of rubber. Such primers suffer from the disadvantage that the diisocyanates are costly, volatile and very toxic and the organic solvents are flammable and uneconomic as compared to water based adhesives.

It is therefore an object of the present invention to provide an improved water based primer system for adhering rubber-resin type pressure sensitive adhesives to a wide variety of non-fibrous film backings.

It is a further object to provide an improved transparent pressure sensitive adhesive tape which is moisture resistant and practically colorless.

Other objects will be apparent in the following detailed description of my invention.

In my copending application Serial No. 693,539 I disclose a primer which contains a copolymer of styrene and maleic anhydride in an ammoniacal solution with rubber latex. I have now found that whereas the primer of my copending application gives superior anchorage and moisture resistance as compared to prior art water based primers, it occasionally would result in tapes of a dark color or of poor color stability.

I have now found that improved color and color stability of transparent colorless non-fibrous film is obtained by substitution of a half ester of a styrene-maleic acid copolymer for the styrene maleic anhydride copolymer. However the anchorage of the adhesive to the film when using a primer formed by merely substituting the resin was unsatisfactory. Therefore a further modification was needed to improve the anchorage. It was discovered that the addition of certain polymers containing combined vinyl pyridine, although such polymers are in themselves colored, would produce a primer of good anchorage and the resulting tape would be substantially colorless and resistant to darkening.

The novel composition of matter which I have discovered thus comprises a mixture of a resinous essentially hydrophobic polymeric material containing partially esterified carboxyl groups, and an elastomer which contains combined vinyl pyridine. The composition may also contain, in addition to the above ingredients a second elastomeric film former such as a natural rubber latex.

The specific film formers which have been found useful are half esters with a low molecular weight alcohol of styrene-maleic acid copolymers wherein the styrene and maleic acid are in about a 1 to 1 molar ratio. The alcohol used to form the half ester may be any simple low molecular weight alcohol such as ethyl, methyl, propyl or iso-propyl. This polymeric material is essentially hydrophobic in that it is insoluble in water but it may be dispersed in ammoniacal solutions.

By employing from 20 to 85 parts of the above described resinous half ester in primer compositions containing a rubbery film former, primers having outstanding clarity and color stability, but poor anchorage to the cellulosic base are obtained. However, I have found that by combining at least 15 parts of an elastomer which is the reaction product of a mixture of monomers containing from 5 to 20% vinyl pyridine or equivalent amounts of lower alkyl derivative thereof, in the composition, a primer of superior color stability transparency and anchorage is obtained.

Exemplary of the primer of my invention is the following composition (dry weight basis):

| | Percent |
|---|---|
| Half ester of styrene maleic acid copolymer | 33 |
| Butadiene-styrene-2-vinyl pyridine terpolymer | 33 |
| Natural rubber | 33 |

The primer of my invention may be prepared in an aqueous ammoniacal solution using commercially obtainable ingredients. A specific example of the preparation of a primer solution is as follows:

| | Parts |
|---|---|
| Ammoniacal Lytron 822 (13% solids) | 73.5 |
| Pyratex latex (47% solids) | 21.3 |
| Natural rubber latex (68% solids) | 15.0 |
| Distilled water | 100 |

"Lytron 822" is a half ester of a styrene maleic acid copolymer sold by Monsanto Chemical Co. in the form of a powder and described in Monsanto's Technical Service Bulletin No. 2646 published prior to January 1959. The ammoniacal solution referred to above is an aqueous ammonia dispersion at 13% total solids having a pH of from about 8 to 11.

Pyratex is a terpolymer of butadiene, styrene, and a vinyl pyridine, containing 16% bound vinyl pyridine obtainable from Naugatuck Chemical Division of U.S. Rubber Company.

Other commercial elastomers containing bound vinyl pyridine are Gen-Tac sold by General Tire and Rubber Company, and Hycar 2508 sold by B. F. Goodrich Chemical Company. I have found that when the terpolymer contains about 15 parts by weight of bound vinyl pyridine per 100 parts of total terpolymer solids, as little as 15 parts of the terpolymer per 100 parts of total solids in the primer composition produces an effective primer. Where the terpolymer contains less vinyl pyridine, the amount of the terpolymer in the mixture should be increased accordingly. For example, if the terpolymer contains only 10% bound vinyl pyridine, there should be present at least about 22 or 23 parts of the terpolymer per 100 parts of the primer composition.

The vinyl pyridine copolymer and/or terpolymers which function in the primer composition of my invention are those which include at least 5% of combined vinyl pyridine. The vinyl pyridine may be one or more substituted or unsubstituted 2-vinyl pyridines or 4-vinyl pyridines. The copolymer or terpolymer includes vinyl pyridine and 1–3 dienes as described below and the terpolymer includes in addition another ethylene derivative such as styrene, acrylonitrile, acrylates etc. The 1–3 dienes which are suitable for the copolymers and terpolymers are 1–3 butadiene, isoprene, etc. Subject to the limitation that the copolymers and terpolymers must contain at least 5% of combined vinyl pyridine, the ratios and amounts of the other ingredients may be widely varied within the range of components resulting in elastomeric products. In general the copolymers and the terpolymers should contain at least 50 and preferably 60% of the 1–3 diene.

Some copolymers of vinyl pyridine useful in my invention are described in U.S. Patent 2,615,826.

Additional examples of the improved primer of my invention are as follows:

|  | Percent by wt. (dry basis) | | | |
| --- | --- | --- | --- | --- |
|  | A | B | C | D |
| Half ester of styrene maleic acid copolymer | 50 | 25 | 25 | 31 |
| Terpolymer of butadiene, styrene, and vinyl pyridine | 50 | 50 | 25 | 16 |
| Natural rubber | | 25 | 50 | 53 |

In general, in order to achieve all of the objects of my invention it is necessary to include in the primer composition at least 20% of the resinous half ester. However, in some cases I may mix rosin and rosin derivatives such as hydrogenated rosin with the half ester of the copolymer.

If desired, cross linking and insolubilizing agents such as water soluble urea and melamine resins, polyhydroxy compounds, formaldehyde and polyamines may be added to the primer composition of my invention to further improve its water resistance.

Instead of the natural rubber latex I may use synthetic rubber substitutes such as copolymers and terpolymers of butadiene, styrene and acrylonitrile. In fact, as indicated by composition A listed above, I may employ the vinyl pyridine containing elastomer as the sole rubbery ingredient. However, since this ingredient is relatively expensive as compared to other elastomers, I prefer to use it in the range of from 15% to less than 50% of the total solids content of the primer (or equivalent amounts, based on vinyl pyridine content when the elastomer contains less than 15% vinyl pyridine).

Where hydrophobic films such as polyvinyl chloride, polyvinylidene chloride, are used it is desirable to substitute a synthetic rubber such as a terpolymer of butadiene, styrene, and acrylonitrile, for the natural rubber in the primer.

For example, the following composition gives excellent adhesion on the above named films and also on cellulose acetate:

| | Parts by wt. |
| --- | --- |
| Hycar 1577 (38% solids) | 40.0 |
| Gen-Tac (41% solids) | 37.4 |
| Ammoniacal Lytron 822 (11.8% solids) | 15.8 |

Hycar 1577 is a copolymer of styrene butadiene and acrylonitrile sold by B. F. Goodrich Chemical Company. In general, terpolymers having compositions within the range taught in U.S. Patent 2,791,571 will be useful in my primer composition as a replacement for natural rubber where bonding to hydrophobic films is desired.

As illustrated in the attached drawing, the aqueous dispersion of the primer is applied in an even coat to the desired cellulosic film in the amount of from 0.08 to 0.12 ounce per square yard and dried to a non-water sensitive condition. Over it is applied a natural or synthetic rubber based pressure sensitive adhesive containing tackifying resins, such as is well-known in the art. Useful pressure sensitive adhesives are referred to in U.S. Patents 2,156,380, 2,177,627, 2,319,959 and 2,553,816.

I claim:

1. A pressure sensitive adhesive tape comprising a non-fibrous film, a primer coat and a rubber based pressure sensitive adhesive overlying said primer coat, said primer coat including (1) at least 20% total solids content of a half ester with a simple low molecular weight alcohol of a copolymer of styrene and maleic acid, and (2) at least 15% total solids content of a terpolymer of butadiene, styrene, and a compound selected from the group consisting of 2-vinyl pyridine, 4-vinyl pyridine and lower alkyl derivatives thereof.

2. A pressure sensitive adhesive tape comprising a non-fibrous film, a primer coat, and a pressure sensitive adhesive overlying said primer coat, said primer coat containing (1) at least 20% total solids content of a half ester with a simple low molecular weight alcohol of a 1 to 1 molar copolymer of styrene and maleic acid, and (2) at least 15% total solids content of a terpolymer of butadiene, styrene, and from 5 to 20% of a compound selected from the group consisting of 2-vinyl pyridine, 4-vinyl pyridine, and lower alkyl derivatives thereof.

3. A pressure sensitive adhesive tape comprising a non-fibrous film, a primer coat, and a rubber based pressure sensitive adhesive overlying said primer coat, said primer coat including: (1) at least 20% total solids content of a half ester with a simple low molecular weight alcohol of a 1 to 1 molar copolymer of styrene and maleic anhydride; (2) at least 15% total solids content of a polymeric elastomer containing, in combined form: an ethylenic derivative selected from the group consisting of styrene, acrylonitrile, and acrylates; at least 50% of a 1,3-diene; and at least 5% of a compound selected from the group consisting of 2-vinyl pyridine, 4-vinyl pyridine, and lower alkyl derivatives thereof; and (3) the remainder of said primer coat comprising natural rubber.

4. A pressure sensitive adhesive tape comprising a non-fibrous film, a primer coat, and a rubber based pressure sensitive adhesive overlying said primer coat, said primer coat including: (1) at least 20% total solids content of a half ester with a simple low molecular weight alcohol of a 1 to 1 molar copolymer of styrene and maleic anhydride; (2) at least 15% total solids content of a polymeric elastomer containing, in combined form: an ethylenic derivative selected from the group consisting of styrene, acrylonitrile, and acrylates; at least 50% of a 1,3-diene; and at least 5% of a compound selected from the group consisting of 2-vinyl pyridine, 4-vinyl pyridine, and lower alkyl derivatives thereof; and (3) an elastomeric terpolymer of butadiene, styrene, and acrylonitrile.

5. A transparent, color stable, non-fibrous film backed pressure sensitive adhesive tape comprising a transparent film having a transparent primer coat thereon, and a transparent pressure sensitive adhesive coating overlying said primer coat, said primer coat including: (1) at least 20% total solids content of a half ester with a simple low molecular weight alcohol of a 1 to 1 molar copolymer of styrene and maleic acid; and (2) at least 15% total solids content of a polymeric elastomer containing, in combined form: an ethylenic derivative selected from the group consisting of styrene, acrylonitrile, and acrylates; at least 50% of a 1,3-diene; and at least 5% of a compound selected from the group consisting of 2-vinyl pyridine, 4-vinyl pyridine and lower alkyl derivatives thereof.

6. A pressure sensitive adhesive tape comprising a non-fibrous backing of regenerated cellulose, a primer coat on one side of said backing and a pressure sensitive adhesive overlying said primer coat, said primer including: (1) at least 20% total solids content of a half ester with a simple low molecular weight alcohol of a 1 to 1 molar copolymer of styrene and maleic acid; (2) at least 15% total solids content of a polymeric elastomer containing, in combined form: an ethylenic derivative selected from the group consisting of styrene, acrylonitrile, and acrylates; at least 50% of a 1,3-diene; and at least 5% of a compound selected from the group consisting of 2-vinyl pyridine, 4-vinyl pyridine, and lower alkyl derivatives thereof; and (3) up to 65% of natural rubber.

7. A pressure sensitive adhesive tape comprising a non-fibrous film backing of a material selected from the group consisting of vinyl chloride, vinylidene chloride, and cellulose acetate; a primer coat, and a pressure sensitive adhesive overlying said primer coat, said primer coat containing: (1) at least 20% total solids content of a half ester with a simple low molecular weight alcohol of a 1 to 1 molar copolymer of styrene and maleic acid; (2) at least 15% total solids content of a polymeric elastomer containing, in combined form: an ethylenic derivative selected from the group consisting of styrene, acrylonitrile, and acrylates; at least 50% of a 1,3-diene; and at least 5% of a compound selected from the group consisting of 2-vinyl pyridine, 4-vinyl pyridine, and lower alkyl derivatives thereof; and (3) an elastomeric terpolymer of butadiene, styrene, and acrylonitrile.

References Cited in the file of this patent

UNITED STATES PATENTS

| | | |
|---|---|---|
| 2,795,515 | Lavanchy | June 11, 1957 |
| 2,817,616 | Wolfe | Dec. 24, 1957 |
| 2,897,960 | Revoir | Aug. 4, 1959 |
| 2,963,462 | Sinn et al. | Dec. 6, 1960 |